United States Patent
Skagerwall et al.

(12) 
(10) Patent No.: US 6,473,781 B1
(45) Date of Patent: Oct. 29, 2002

(54) COMMUNICATION SYSTEM AND METHOD

(75) Inventors: Roger Skagerwall, Enskede; Kaj Nygren, Stockholm, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/179,440

(22) Filed: Oct. 27, 1998

(51) Int. Cl.[7] .............................. G06F 15/16; G06F 9/49
(52) U.S. Cl. .................... 709/201; 709/310; 709/315; 709/316; 707/3; 707/7; 707/10; 707/103
(58) Field of Search .................... 709/201, 202, 709/203, 310–320, 327, 330, 329, 245; 235/375; 707/10, 1, 7, 3, 103; 380/51

(56) References Cited

U.S. PATENT DOCUMENTS

| | | | |
|---|---|---|---|
| 4,654,482 A | 3/1987 | DeAngelis | 379/93.12 |
| 4,780,599 A | 10/1988 | Baus | 235/383 |
| 4,937,853 A | 6/1990 | Brule et al. | 463/17 |
| 4,941,170 A | 7/1990 | Herbst | 379/100.07 |
| 5,111,391 A | 5/1992 | Fields et al. | 705/9 |
| 5,115,326 A | 5/1992 | Burgess et al. | 358/400 |
| 5,227,893 A | 7/1993 | Ett | 358/400 |
| 5,239,487 A | 8/1993 | Horejsi et al. | 702/184 |
| 5,280,625 A | 1/1994 | Howarter et al. | 709/218 |
| 5,288,976 A | 2/1994 | Citron et al. | 235/375 |
| 5,324,922 A | 6/1994 | Roberts | 235/375 |
| 5,398,336 A | 3/1995 | Tantry et al. | 707/103 R |
| 5,473,146 A | 12/1995 | Goodwin, III | 235/283 |
| 5,640,193 A | 6/1997 | Wellner | 725/100 |
| 5,748,899 A | 5/1998 | Aldrich | 709/222 |
| 5,804,803 A * | 9/1998 | Cragun et al. | 235/375 |
| 5,808,911 A * | 9/1998 | Tucker et al. | 709/316 |
| 5,905,248 A | 5/1999 | Russell et al. | 235/462.15 |
| 5,973,731 A | 10/1999 | Schwab | 348/161 |
| 6,219,717 B1 * | 4/2000 | Filovsky et al. | 709/315 |
| 6,151,639 A * | 11/2000 | Tucker et al. | 709/316 |
| 6,263,379 B1 * | 7/2001 | Atkinson | 709/332 |
| 6,282,579 B1 * | 8/2001 | Carre | 709/313 |
| 6,282,581 B1 * | 8/2001 | Moore et al. | 709/316 |

FOREIGN PATENT DOCUMENTS

| | | |
|---|---|---|
| EP | 0 624 964 | 11/1994 |
| WO | 89/02631 | 3/1989 |
| WO | 92-09054 | 5/1992 |
| WO | 96-05681 | 2/1996 |
| WO | 96-13949 | 5/1996 |
| WO | 99/17230 | 4/1999 |
| WO | 99/22501 | 5/1999 |

OTHER PUBLICATIONS

"Agent Augmented Reality: A Software Agent Meets the Real World"; Katashi Nagao and Jun Rekimoto, Sony Computer Science Laboratory Inc., ICMAS–96.

(List continued on next page.)

Primary Examiner—Mark H. Rinehart
Assistant Examiner—Hai V. Nguyen
(74) Attorney, Agent, or Firm—Burns, Doane, Swecker & Mathis, L.L.P.

(57) ABSTRACT

Communication system and method for linking each of a plurality of tagged object to information services stored on a network. The system reads an object tag of one of the objects and retrieves information about the object stored on storage located at arbitrary places. To facilitate the retrieval of information, a directory is provided storing object data associating each of the objects with information services. In order to be able to handle a virtually arbitrary number of objects and information services, the directory includes a plurality of directory servers, each storing part of data base of the object data. The object data is distributed according to a defined scheme onto the plurality of directory servers in order to be able to identify the directory server storing object data associated with a particular read object tag.

29 Claims, 10 Drawing Sheets

OTHER PUBLICATIONS

Eberhardt, R. et al., "Electronic Commerce—A Comparative Study of WEB Based Database Access", ISS '97 World Telecommunications Congress (international Switchin Symposium), Global Network Evolution: Convergence or Collision?, Toronto, Sep. 21–26, 1997, vol. 2, pp. 97–104.

Patankar, A.K. et al., "A Directory Service for a Federation of CIM Databases with Migrating Objects"; Proceedings of the Twelfth International Conference on Data Engineering, New Orleans, Feb. 26–Mar. 1, 1996, No. CONF. 12, pp. 142–150.

"Portable Self–Checkout Retail System", IBM Technical Disclosure Bulletin, vol. 35, No. 1A, Jun. 1992 pp. 315–318.

* cited by examiner

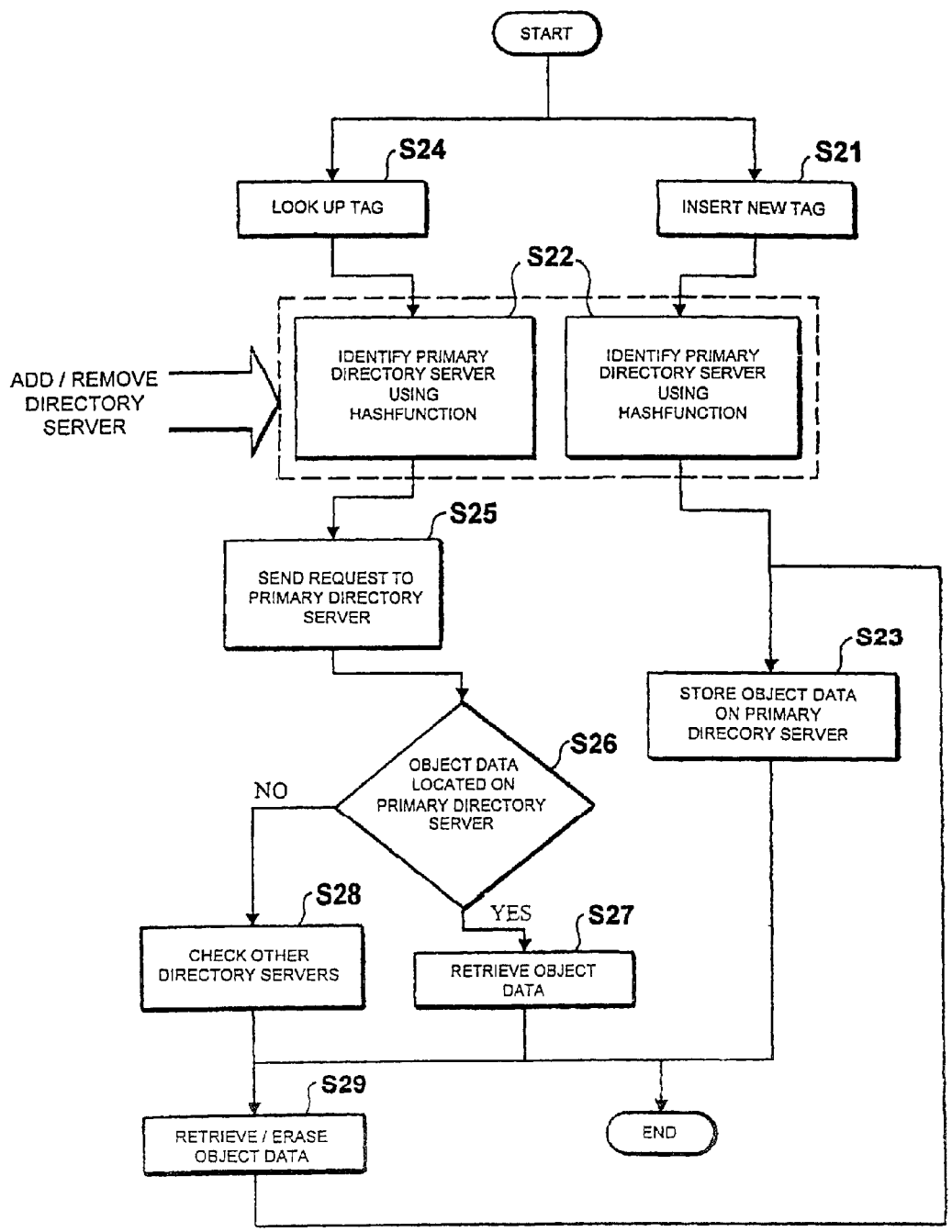

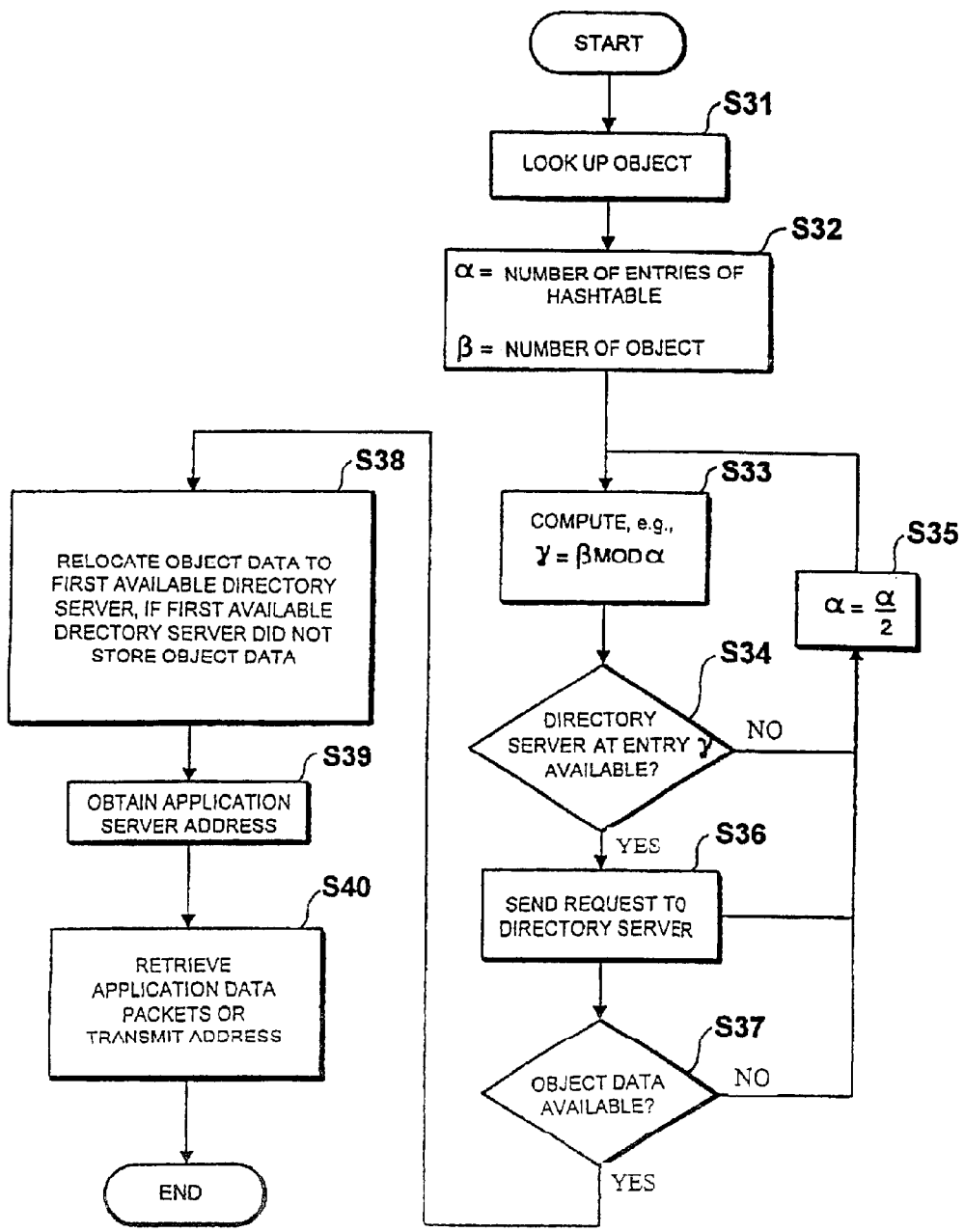

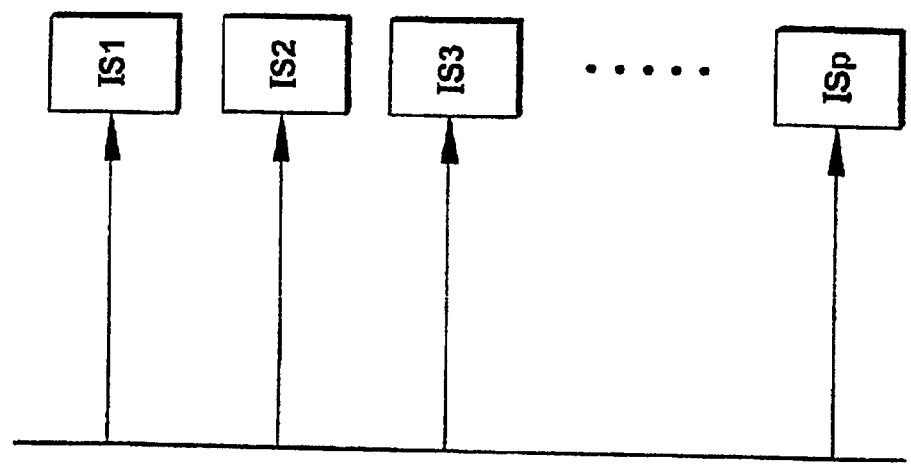
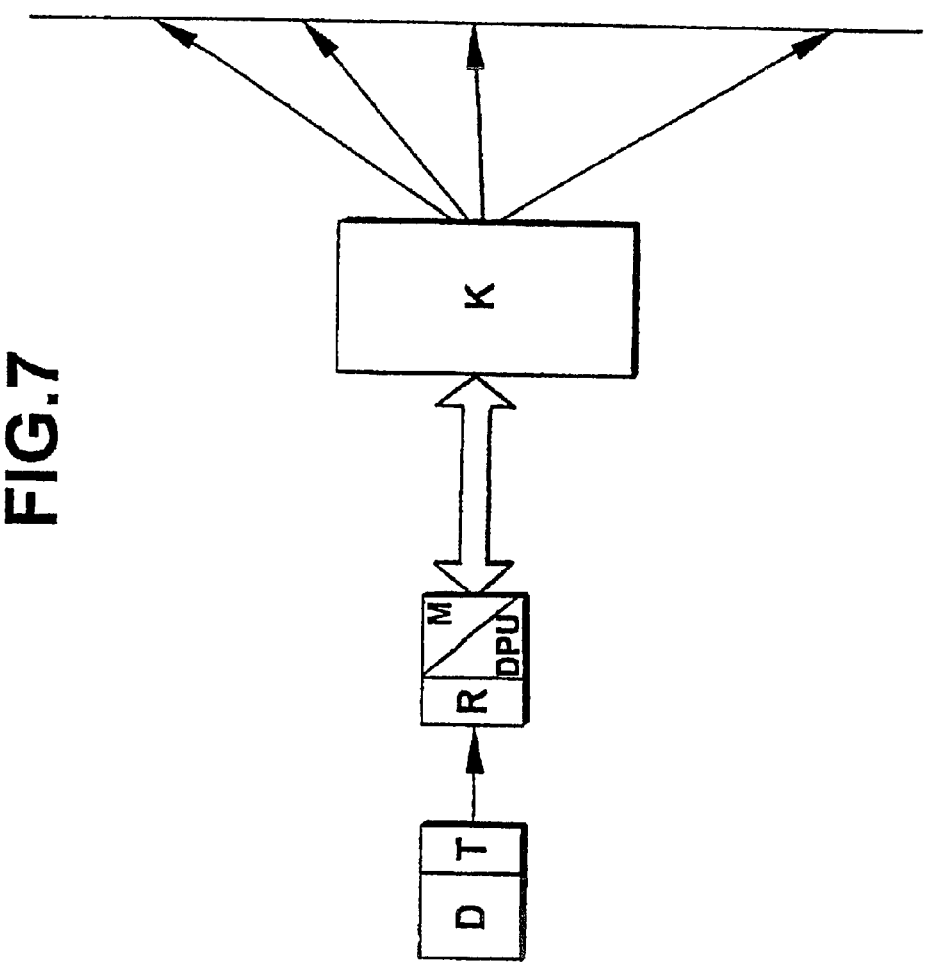
FIG.7

US 6,473,781 B1

COMMUNICATION SYSTEM AND METHOD

This application claims priority under 35 U.S.C. §§119 and/or 365 to 197 47 583.3 filed in Federal Republic of Germany on Oct. 28, 1997; the entire content of which is hereby incorporated by reference.

FIELD OF THE INVENTION

The present invention relates to a system and method of communicating information in a network, and in particular, the present invention relates to a system for communicating information, related to a plurality of tagged objects, in a network.

BACKGROUND OF THE INVENTION

In recent years, data communication techniques have evolved tremendously. Electromechanical equipment for communicating information over larger distances is now widely replaced by digital systems using semiconductor switches. With the availability of cheap data processing capacity in today's world, it is now possible for virtually everyone to not only communicate voice and audio signals but also data stored on computers, data bases, etc. Especially with the advent of computer networks, such as the Internet, connecting computers virtually all over the world, easy and inexpensive access to digital information becomes possible worldwide.

The Internet and similarly other networks can be used for a variety of different applications. It is, for example, possible to retrieve information about a specific topic by accessing files which may be physically located at arbitrary places, essentially worldwide. The files may contain text, audio signal, images, video or data related to applications.

In order to be able to access the files it is required to know the name of the documents and further, it is required to know the addresses of network computers storing the documents. However, in many cases, information about the name and location of documents related to a desired topic or physical object is not available and, means for retrieving information about possible locations of documents or applications related to the topic are required. Therefore, on most common networks various applications are available, to assist an user in identifying names of documents as well as addresses of servers storing the documents related to the object.

Generally, the assisting applications perform a more or less detailed network search based on a keyword or sets of keywords provided by the user. A search result typically is a list of addresses and links to servers storing information related to the desired topic. The user can select each record of the list and retrieve associated documents or services. In many cases, however, it will turn out that a very long list of addresses and links is returned, but only a small number thereof is actually related to the desired topic. Key words supplied to a search application will often result in lists with thousands of entries and many entries of the list will only intermediately be related to the object or not at all.

Retrieving information from a network can therefore be a tedious and time-consuming task, and the result might not be satisfying. This situation is further severed by the swift growth of such networks.

There might be essentially two reasons causing the difficulty for a user to retrieve information about a specific object in. Even if the user knows some key facts about the desired object, the search might still miss important information concerning the object and secondly, often key information about the desired object is lacking and it therefore is not possible for the user to specify proper search terms, even if he knows which object he wants to retrieve information for. The user will also face the problem that it is not possible to get a determined answer whether desired information is available on the network or not, i.e., the information may exist, even if the conducted search failed.

It is therefore desirable to design a system, which readily delivers focused information about a certain topic or object without the need of performing time consuming network searches with sophisticated arrangements of search terms, in order to narrow down the number of "hits".

In the physical world, a large number of different objects, manmade or natural, exists and similarly, in the virtual world of a computer network information exists about virtually all physical objects. However, as outlined before, it is difficult to retrieve information related to a specific object. Thus there is a need for a system, which links physical objects with services in the information space.

A number of proprietary systems is known from daily life, which allow to connect a limited number of objects to information about the objects. For example, such systems may link car spare parts to information of a data base. A part number may be entered into the system and drawings, information about availability, price, etc., is returned. Similar systems are encountered supermarkets. The systems are able to display information related to an object under investigation or to account for sold items, prices, etc.

However, all of the above systems have several limitations regarding scalability with respect to the number of objects and associated information services, robustness and generality.

Further, "broken" links, i.e., links and addresses stored by a user at one point in time and which are not any longer valid, pose a problem in computer networks. The location of information or services, i.e., the address of the computer of the network storing the information or service, as well as filenames usually change over time due to a rearrangement of servers, network addresses and the like. In this case, a called address or link for retrieving a certain service from the network may no longer be valid and an error message is returned to the user. Obviously, it is thus desirable to avoid the broken links, in order to be able to retrieve information about an object without fail.

SUMMARY OF THE INVENTION

It is therefore object of the invention to provide a system and method capable of communicating information associated with an arbitrary number of objects.

This object of the invention is solved by a communication system, comprising: a plurality of objects (D) each identified by an object tag (T); a plurality of application servers each having an address (IS; IS1–ISp) and each including memory means for storing a plurality of application data packets, each related to one of the objects and identified by an application identifier (AI1–AIm); reading means (R) for reading one of the plurality of object tags (T); a system kernel (K), including: a plurality of directory servers (DS; DS1–DSn) each having an address and including memory means (TM; AM) for storing in a distributed data base object data associating each of the objects with at least one of the application data packets; means for receiving the read object tag (T) from the reading means (R) and means for identifying the directory server for storing object data related to the read object tag and retrieving the object data; and means for retrieving at least one of the application data packets based on the object data or transmitting at least part of the object data to a receiving unit (M, DPU).

The object of the invention is further solved by a communication system, comprising: a plurality of objects (D) each identified by an object tag (T); a plurality of application servers each having an address (IS; IS1–ISp) and each including memory means for storing a plurality of application data packets, each related to one of the objects and identified by an application identifier (AI1–AIm); reading means (R) for reading one of the plurality of object tags (T); a system kernel (K), including: a plurality of directory servers (DS; DS1–DSn) each having an address and including memory means (TM; AM) for storing in a distributed data base object data associating each of the objects with at least one of the application data packets; memory means for storing a list of all available directory servers in a hashtable (H); means for receiving the read object tag (T) from the reading means (R); means (DS; DS1–DSn; AS; AS1–ASr), using a hashfunction for identifying the directory server (DS; DS1–DSn) for storing the object data related to the read object tag, based on the hashtable and retrieving the object data; and means for retrieving at least one of the application data packets based on the object data or transmitting at least part of the object data to a receiving unit (M, DPU).

Still further, the object of the invention is solved by a method of communicating information, comprising: marking each of a plurality of objects with an object tag; storing a plurality of application data packets, each identified by an application identifier, in memory means of a plurality of application servers, each identified by an application server address; storing in each of a plurality of directory servers (DS; DS1–DSn) part of a distributed data base of object data associating the plurality of objects with the plurality of application data packets; reading one of the object tags using a reading means (R) and transmitting the read object tag to an access server (AS; AS1–ASr); identifying the directory server (DS; DS1–DSn) storing object data corresponding to the object tag; obtaining the address of at least one of the application servers storing at least one of the application data packets associated with the object based on the object data; and retrieving the at least one of the application data packets using the address or transmitting data corresponding to the address to a mobile telephone (M) or a data processing unit (DPU).

Still further, the object of the invention is solved by a method of communicating information, comprising: marking each of a plurality of objects with an object tag; storing a plurality of application data packets, each identified by an application identifier, in memory means of a plurality of application servers, each identified by an application server address; storing a list of a plurality of available directory servers in a hashtable; mapping all object tags employing a hashfunction and the hashtable onto the directory servers; storing in each of the plurality of directory servers (DS; DS1–DSn) part of a distributed data base of object data associating the plurality of object tags with the plurality of application data packets; reading one of the object tags using a reading means (R) and transmitting the read object tag to an access server (AS; AS1–ASr); identifying the directory server (DS; DS1–DSn) storing object data corresponding to the object tag using the hashfunction; obtaining the address of at least one of the application servers storing at least one of the application data packets associated with the object based on the object data; and retrieving the at least one of the application data packets using the address or transmitting data corresponding to the address to a mobile telephone (M) or a data processing unit (DPU).

The invention advantageously allows to link an arbitrary number of objects of the real world to information services stored on an arbitrary number of data processing units or application servers, which may be located at arbitrary places. The services may be text, images, application programs or any other kind of messages. The data processing units or application servers preferably store a plurality of application data packets comprising data related to the services. Each of the plurality of application data packets may be associated with one of the plurality of objects of the real world, i.e., it contains information related to the object. The application data packets may be of arbitrary size.

Advantageously, each of a plurality of directory servers stores part of an arbitrarily scaleable data base containing object data associating each of the objects with at least one of the application data packets. The plurality of directory servers serve as key resource in retrieving an application data packet related to an object. Means for receiving a read object tag from a reading means and for identifying the directory server for storing object data related to the read object tag and retrieving the object data are provided. During operation, a system kernel receives data of an object tag associated to one of the plurality of objects, and based on a search performed by at least one of the plurality of directory servers, obtains the address of a storage location or locations, i.e., the address of application servers storing application data packets related to the object. Subsequently the application data packets may be retrieved and can be supplied to a device. The device may be a mobile telephone or a data processing unit or the like. Alternatively, object data related to the read object tag can be transmitted to the device. The invention thus advantageously allows to connect different services from different providers.

In an advantageous embodiment of the invention each of the plurality of directory servers comprises tag memory means storing information about which of the plurality application data packets is associated with particular ones of the plurality of objects. Thus, a tag data block advantageously may comprise at least one object tag and at least one application identifier. Also, tag data blocks may comprise addresses of application servers storing application data packets corresponding to the application identifiers.

Each of the directory servers may advantageously also comprise address memory means for storing address data blocks including information about application server addresses storing the application data packets specified in the tag memory means. An address data block may advantageously be provided for each application data packet. Thus, an address data block may store an application identifier and the application server address of the server storing the corresponding application data packet. Address data blocks may also store object tags of objects associated to an application data packet. The address data blocks may advantageously be used for removing application identifiers from object data, if corresponding application data packets are removed.

Tag memory means and address memory means advantageously allow to solve the problem of broken links, since an object, via its tag, can indirectly be linked to particular storage locations, i.e., addresses of specific application servers. A look-up of a specific application data packet related to a particular object may therefore advantageously be performed by searching for a specific object tag in the tag memory means and subsequently, application server addresses for respective application identifiers may be retrieved from the address memory means.

In another embodiment of the invention the system advantageously comprises memory means for storing a list of available directory servers in a hashtable and a hashfunction is provided for identifying a particular one of the directory servers for storing information related to a specific object based on the hashtable. The hashfunction is thus used for mapping all object tags onto the plurality of directory servers. The hashfunction can be used in operations for storing and removing one of the object tags and associated object data, retrieving object data related to one of the object tag from one of the directory servers, and relocating object data from one of the directory servers to another.

Advantageously, all object tags and directory server addresses may be numbered in an ascending order, tag data blocks of object tags with sequential numbers are stored on directory servers with sequential numbers and the list of all available directory servers, i.e., their addresses, sorted by assigned numbers, are maintained as the hashtable. Thus, the directory server storing information related to a particular one of the objects can be identified by the hashfunction. The determined directory server is likely to store object data related to the object tag. If it does not store the object data, the output range of the hashfunction can be halved.

If an object is to be inserted into data base of object data, the appropriate directory server can advantageously be computed using the hashfunction. Further, if a new directory server becomes available and is inserted into the hashtable, storing locations of application data blocks may advantageously be recomputed using the hashfunction.

Preferably, the hashtable is stored by at least one supervisor server, however, any other component of the system kernel may store the hashtable or a copy of the hashtable. It is thus possible that copies of the hashtable are stored on the directory servers, etc. The copies of the hashtable may advantageously be updated only periodically, in order to reduce processing time. Providing copies of the hashtable at a plurality of devices of the system further reduces the response time of the system, since look up operations can be performed by many devices.

Further, a plurality of broker servers may be provided for storing information about components of the system kernel. The broker servers may also store copies of the hashtable.

Advantageously, retrieved application data packets may be communicated via fixed and wireless communication links to a mobile telephone or to a data processing device, used for playback or display of information. Data conversions, such as speech processing, can advantageously be performed by specifically provided resource means.

Further, in order to provide a robust system, components of the system kernel can be replicated by replication components.

Still further advantages of the invention are described in dependent claims.

BRIEF DESCRIPTION OF THE FIGURES

The invention can be more fully understood, if it is seen in conjunction with the accompanying drawing, wherein;

FIG. 2a shows a flow chart of steps performed in accordance with an embodiment of the invention for storing, retrieving and relocating object data associated with an object tag.

FIG. 3 shows a flow chart of steps performed in accordance with an embodiment of the invention for retrieving application data packets associated with an object;

FIG. 7 shows an embodiment of the system according to the invention including the Internet;

DETAILED DESCRIPTION OF EMBODIMENTS

In the following, preferred embodiments of the invention are described with respect to the figures.

Figure 1:
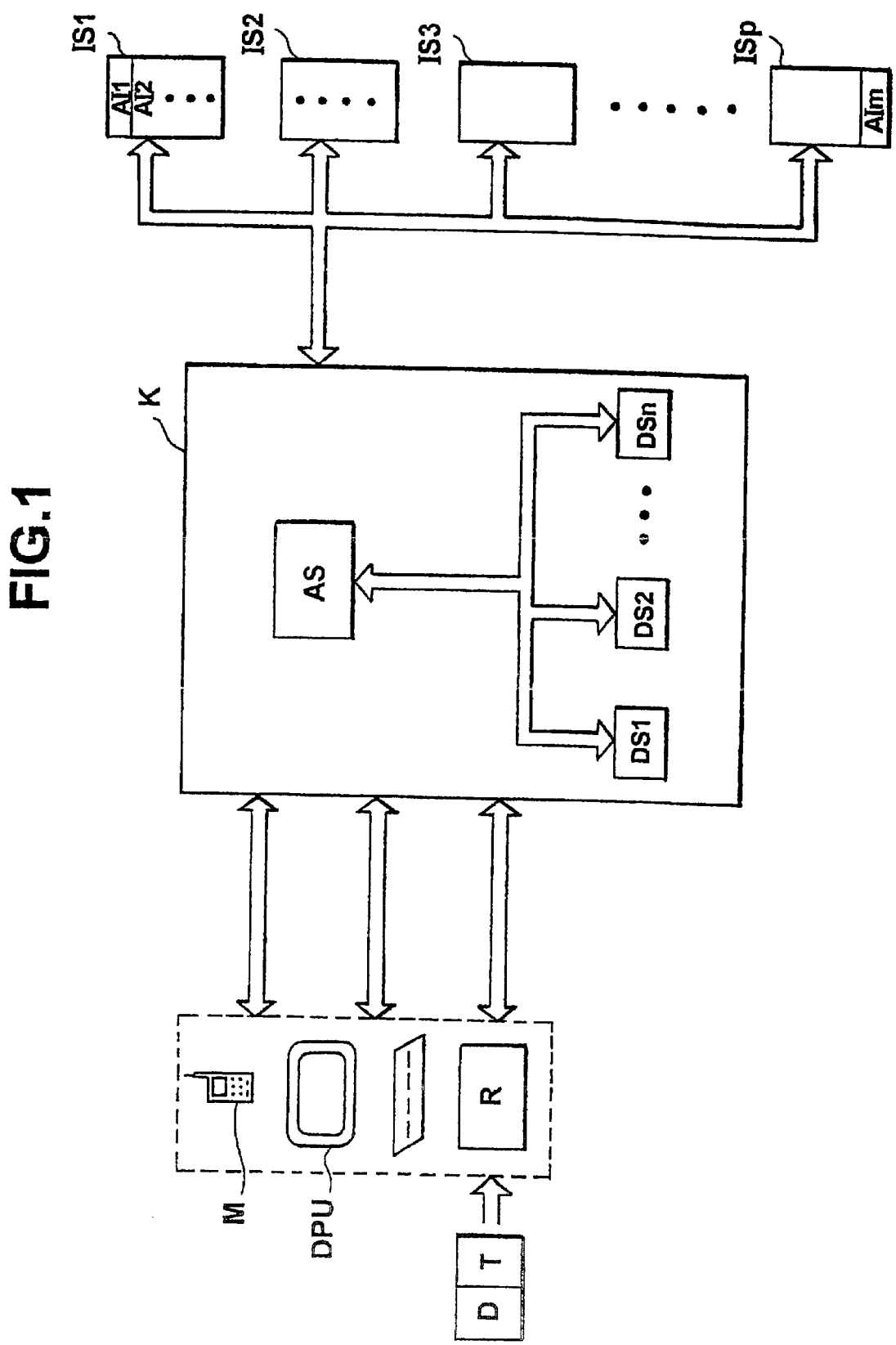
FIG. 1 shows a block diagram of an embodiment of the invention.

FIG. 1 shows a block diagram of an embodiment of the system according to the invention. The system is arranged to link each of a plurality of objects with corresponding ones of a plurality of information services.

The embodiment of FIG. 1 comprises a system kernel K with at least one application server AS; AS1–ASr and a plurality of directory servers DS; DS1–DSn. The system kernel K is arranged to communicate data between a plurality of application servers and a telephone M, a data processing unit DPU or the like. The application servers each have an address IS; IS1–ISp and store a plurality of application data packets, each having an application identifier AI1–AIm. The application servers may be part of a known datacom- or telecom network, such as the Internet. A plurality of objects D is marked with a plurality of tags T, one each is shown. A reader R is provided for reading data of an object tag and transmitting same the system kernel K.

The system is arranged to link the plurality of objects, which can, for example, be any products or items of the physical world to various kinds of information related to the objects. It is thus possible to associate each specific one of the objects to a focused set of information services. A user may retrieve such a set of information services related to a particular one of the objects D or information about the information services by reading the object tag T; T1–Tw using the reader R. The information about the object is then automatically obtained by the system kernel K from a corresponding one of the application servers. Obtained information may be sent from the system kernel to the telephone M, which may be a regular telephone or a mobile telephone, or to the data processing unit DPU.

With the system according to the invention, the user is, e.g., able to access default information related to an object or a group of objects, for example, as provided by the manufacturer of the particular objects or products. Further, the user can execute a specific service related to the object. The user can also look up services available for an object, for example a list of services associated with the object and may browse the list. In this case a list of all services associated with the object can, e.g., be displayed on the display of the data processing unit DPU operated by the user. The system may also be used to automatically read object tags, e.g., within a room or passing a door or the like.

The plurality of application servers with the addresses IS; IS1–ISp and storing data related to the objects D may be placed at arbitrary locations in the world, similar to today's computer networks, such as intranets, company networks or the Internet. It is also possible that part or all of the plurality of application servers constitute part of at least one known datacom- or telecom network and that the system kernel K only serves as a link between objects and services. The application servers thus may be dedicated devices or shared with other networks. Data stored on the application servers can, for example, be text, such as a user manual of a product, links to other servers storing related data or other kind of written information. Further, the data can comprise images, video, audio signals and the like. It is also possible that the exchange of data via the system kernel K between application servers and the mobile telephone and/or data processing unit includes an interactive execution of an application.

The reader R is arranged to read one of a plurality of object tags T; T1–Tw. The reader may be a bar code reader or any other reading device. The object tags can be active or passive tags, as commonly used and preferably are very small. Tags in the mm range are available today.

The reader R may be an independent device (PCMCIA size), connected to the mobile telephone M and/or data processing unit DPU, or may be integrated into the mobile telephone M and/or data processing unit DPU, as indicated in FIG. 1 by a broken line enclosing the reader, the mobile telephone M, the data processing unit DPU. For reading an object tag, a user preferably directs the reader at an object tag and initiates the reading process. It is, however, also possible, that object tags are read automatically, e.g., if in the vicinity of the reader.

The transmission of information between the reader R, the mobile telephone M and the data processing unit DPU and the system kernel K may be performed via wireless communication or via fixed communication lines. For example, data transmission may include a mobile telephone network, a telephone networks using fixed lines and computer networks.

Even though FIG. 1 only shows one reader R, the system is able to serve a large number of users operating a large number of readers. A user can be located anywhere, the only requirement is that the user connects to the system kernel for issuing a request for information and transmitting a read object tag. Preferably each user is also equipped with a device for receiving information retrieved from one of the application servers or directory servers which, e.g., may be the mobile telephone M or the data processing unit DPU.

In operation, the system kernel K receives a request for information from a user containing the object tag T; T1–Tw of an object D read by the reader R. Upon reception of the request, the system kernel K performs operations to identify application servers storing information related to the object D. Once the application servers and the addresses IS; IS1–ISp, respectively, are appropriately identified, data associated with the object D can be retrieved from the application server and supplied to the user.

Since the amounts of data handled by the system, i.e., the number of objects and the number of application data packets may be extremely large, a single unit can not handle all information associating objects with application data packets. Therefore, the system kernel K includes the plurality of the directory servers DS; DS1–DSm, each storing part of a data base of object data associating each of the application data packets with at least one of the plurality of objects.

It is preferred, that means are provided maintain information about available kernel components. In general, the information may be kept in any component of the system kernel. However, it is also possible, to provide one or a plurality of dedicated supervisor servers (not shown) for this purpose. The number of supervisor servers may, e.g., depend on traffic handled by the system. The supervisor server/servers may, e.g., maintain an always up to date list of addresses of all directory servers. In addition, periodically updated copies of the list may be stored elsewhere in the system kernel.

It is a key aspect of the invention that the data base of object data is distributed over a plurality of directory servers DS; DS1–DSn, allowing that the number of objects can be scaled almost arbitrarily by adding new directory servers to the existing ones for storing new object data. Each of the directory servers DS; DS1–DSn preferably stores object data related to a small number of the range of available object tags T; T1–Tw. As mentioned above, object data related to an object tag preferably includes application identifiers AI1–AIm of application data packets related to the object as well as information about storage locations of the application data packets, e.g., the addresses of application servers IS; IS1–ISp storing the application data packets.

According to an embodiment of the invention, the retrieval of application data packets by the system kernel K can be performed in two steps. In a first step the directory server storing object data related to an object is identified and the object data is retrieved. In a second step, using the object data, application data packets are retrieved from application servers and/or the object data or parts thereof are transmitted to the user, i.e., to the mobile telephone M and/or the data processing unit DPU.

The first step of identifying the correct directory server may be performed via a look up in a hashtable H containing addresses or identifiers of all available directory servers DS1–DSn. To facilitate this look up procedure, a hashfunction is used.

The hashfunction is used to map the plurality of objects onto the plurality of directory servers DS; DS1–DSn. Since the number of objects will be larger than the number of directory servers, the hashfunction is used to assign object data related to a group of objects to each of the directory servers. Thus, each of the object tags is assigned to a target directory server using the hashfunction. Preferably, the hashfuncition distributes the object tags evenly over the available directory servers. To facilitate such mapping, preferably a sequence of all objects and directory servers is defined, e.g., by numbers, strings or the like. Many different mapping schemes or hashfunctions can be employed.

Since the distribution of object data over the plurality of directory servers thus follows a defined scheme corresponding to the hashfunction, it is possible to use the same scheme for identifying the target directory server storing object data related to a particular object tag. If the object data should not be found on the target directory server due to changes to the data base, the hashfunction includes further steps to identify the actual directory server storing the object data, as outlined with respect to further embodiments.

The hashfunction can also be employed, if new object data is to be inserted into the data base on the directory server, if data has to be relocated or when the number of directory servers changed, as outlined later in more detail.

The system kernel K of the described embodiment comprises at least one access server AS; AS1–ASr, which preferably is responsible for receiving a request for information about an object including an object tag T; T1–Tw read by the reader R. Further, preferably the at least one access server AS; AS1–ASr is responsible for retrieving addresses IS; IS1–ISp of application servers obtained from at least one of the directory servers DS; DS1–DSn and/or retrieving corresponding application data packets. In the embodiment of FIG. 1, the at least one access server AS; AS1–ASr executes the chain of requests connected to retrieving information from the system with respect to the object tag T; T1–Tw read using the reader R.

In other embodiments, a plurality of arbitrarily located access servers AS; AS1–ASr may be provided, each serving a group of users, e.g., grouped by geographic location, or serving a subgroup of the plurality of objects.

After receiving a request for information including the object tag T, the access server AS; AS1–ASr performs operations to identify the directory server DS; DS1–DSn storing information concerning application data packets related to the object.

This preferably includes sending the request including the object tag T; T1–Tw to one of the directory servers DS1; DS2; . . . ; DSn, which in turn, using the hashfunction and hashtable H, determines the directory server for storing the object tag T; T1–Tw and forwards the request to that particular directory server. However, it is also possible, that the access server AS; AS1–ASr or other components of the system kernel K perform steps for identifying the correct directory server.

After identification of the correct directory server DS; DS1–DSn, the request, including the object tag T; T1–Tw, is forwarded to the identified directory server. The directory server, in a subsequent step, performs operations to determine all addresses of application servers IS; IS1–ISp storing application data packets associated with the read object tag T; T1–Tw and thus object D. Intermediate steps are possible, where the look up request is relayed to further devices before it reaches the correct directory server, as outlined later.

The obtained addresses IS; IS1–ISp and optionally other information can be returned to the access server AS; AS1–ASr, which in the following retrieves the specified application data packets from the identified application servers or transmits the addresses IS; IS1–ISp and possibly other information directly to the user, i.e., the mobile telephone M or the data processing unit DPU.

As noted before, the application servers provide various services associated to physical objects. However, the system according to the invention is preferably compatible with other information systems, in order to include additional information services. A compatible system can, for example, be the Internet. In this case WWW information could be retrieved based on an object tag by the system according to the invention. It is also possible, that the system entirely uses storage means of existing computer networks, such as the Internet, and does not provide application servers of its own. It is further possible, that the system and method according to the invention use standard and/or amended protocols of a known datacom- or telecom network for retrieving information associated with an object.

In the following, with respect to FIG. 2, an embodiment of a list of available directory servers DS; DS1–DSn, maintained in the hashtable H, is described.

As outlined above, after receiving an object tag T; T1–Tw from the reader R, the access server AS; AS1–ASr transmits the request to one of the directory servers, which in turn performs an operation to identify the particular one of the plurality of directory servers DS; DS1–DSn for storing object data related to the received object tag T.

The hashtable may be stored by any component of the system kernel K. However, preferably, an always up to date hashtable for keeping track of newly available directory servers and of removed directory servers is stored in at least one supervisor server HS1–HSt. Copies of the hashtable may additionally be stored in each of the directory servers for performing look up operations upon receiving a request regarding the correct directory server. Further, copies of the hashtable can be stored in the at least one access server or broker servers, not shown.

The copies of the hashtable do not necessarily have to be always up to date. They are preferably updated only periodically by updating means, also not shown. Since the look up of object data is a non-critical step, resources can be saved by only periodically updating the copies of the hashtable H.

As briefly outlined with respect to FIG. 1, it is preferred, that one of the directory servers DS1; DS2; . . . ; DSn identifies the directory servers storing information related to a requested object tag. However, other components of the system kernel K may serve as means for identifying the correct directory servers.

Preferably, the hashtable H comprises a number of entries for storing records including addresses of application servers.

Figure 2:
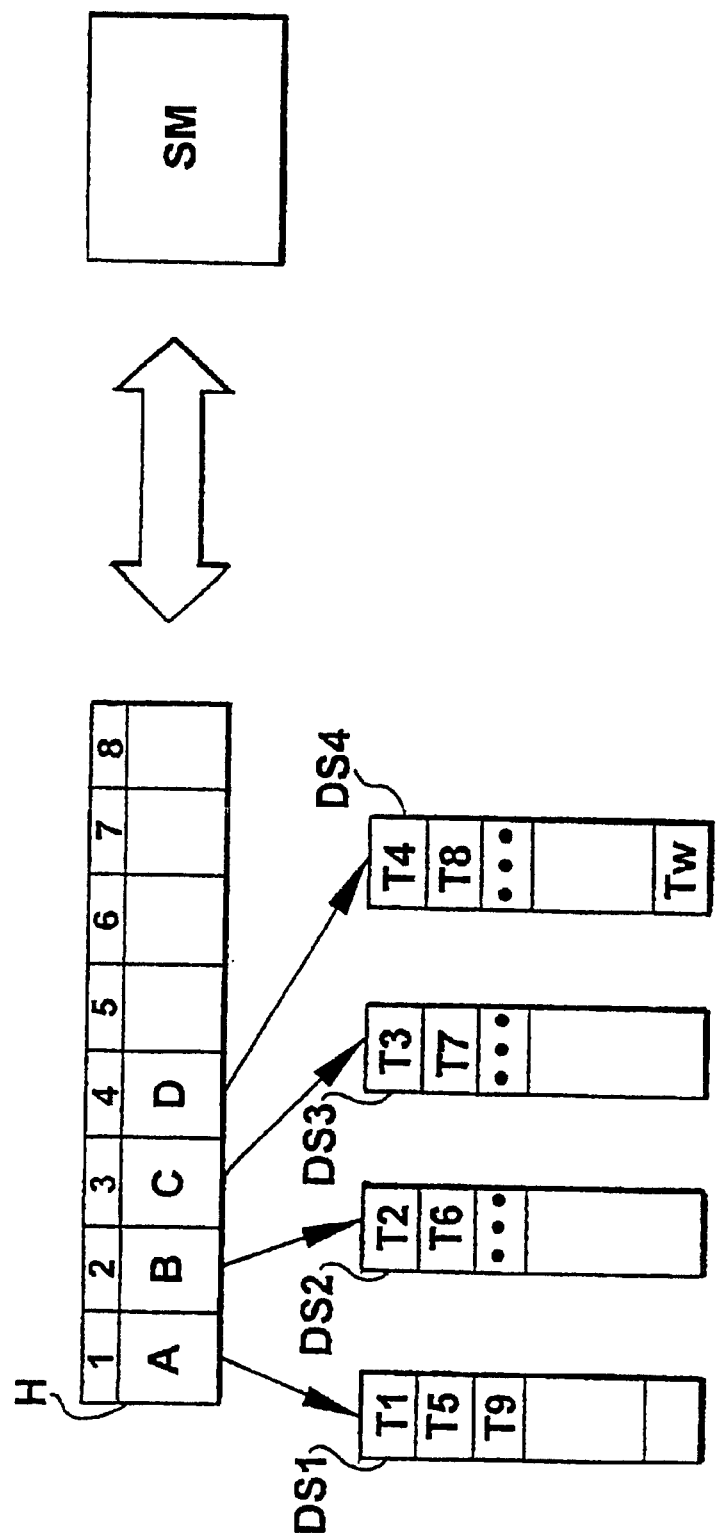
FIG. 2 illustrates an embodiment of the hashtable used to perform a lookup operation for identifying a particular one of the directory servers.

In the example of FIG. 2 the hashtable comprises 8 entries, addresses of available servers are stored as records in respective sequential entries of the hashtable. Thus, the hashtable constitutes an ordered list of all available directory servers, as shown in FIG. 2. The records stored in the hashtable H are indicated by A, B, C and D stand for addresses of four directory servers DS; DS1–DSn. However, any other order is possible, e.g., D, B, A, C.

To avoid unnecessary look up operations for object tags at directory servers, as outlined above, it is preferred that object data is stored on directory servers according to the hashfunction, which may be executed by search means SM indicated in FIG. 2. The search means SM groups object tags, preferably in correspondence with the number of objects and the number of available directory servers, i.e., a target directory server for storing as well as for retrieving object data is determined based on an identifier of an object tag, which, e.g., may be a number assigned to the tag, and the number of available directory servers DS; DS1–DSn.

The object tags may be grouped and object data related to each group of object tags may be stored on one of the plurality of directory servers using hashfunction or any scheme. It only needs to be assured that for storing object data related to objects on the directory servers and for determining the correct directory server upon receiving a request for information concerning an object, the same scheme or hashfunction is used. For example, as a storage scheme, all object tags and directory servers could be numbered sequentially and object data related to object tags with sequential numbers may be stored directory servers with sequential numbers.

In the shown embodiment, a hashfunction is used, which maps object tags with sequential numbers onto directory servers with sequential numbers. Thus, each of the directory servers DS; DS1–DSn stores a subgroup of sequentially numbered object tags T1–Tw, whereby object tags with sequential numbers are stored on directory servers with sequential numbers. Accordingly, object data related to the first object tag T1 is stored on the first directory server DS1, object data related to the second object tag T2 is stored on the second directory server DS2, object data related to the third object tag T3 is stored on the third directory server DS3 and object data related to the fourth object tag T4 is stored on the fourth directory server DS4. Since 4 directory servers are available, object data related to the fifth object tag T5 is again stored on the first directory server DS1 and likewise all other object tags are stored on the available four directory servers.

The above hashfunction for storing/retrieving object data on directory servers only serves as an example, other mapping schemes may be used. For example, it is also possible, that blocks of object tags with numbers in certain ranges could be stored on a particular directory servers.

An important feature of the system is the ability to handle a large data base of object data. Further, the system provides features to adapt to a varying size of the data base of object data. Specifically, the system is able to handle the insertion of new object data or removal of obsolete object data. Also, in case the capacity of the system needs to be increased, new directory servers can be added and storage locations of object data can be rearranged accordingly. Similarly, directory servers may be removed. All of this is accomplished by suitably arranging the hashtable H and suitably assigning directory servers for object data using the hashfunction.

In the following, an example of processing steps for maintaining the hashtable H and data base of object data up to date and steps for retrieving object data are described with respect to FIG. 2a.

First, some maintenance operations are briefly outlined in general.

If a new directory server becomes available, it may be added to the hashtable H as a new record. Analogously, one of the directory severs could be removed, in which case one of the hashtable entries becomes vacant.

However, in the case the number of available directory servers changed, previously stored object data was mapped onto the plurality of directory servers using a hashfunction based on the previous number of directory servers, whereas a target directory server is now identified based on a new number of directory servers. This will sometimes not lead to the directory server actually storing object data related to the desired object. In this case the hashfunction may be designed to interrogate the remaining directory servers according to a specific sequence until the directory server actually storing the desired object data has finally been identified.

In the above case it is now preferred that the previously stored object data is transferred to the correct target directory server, i.e., the directory server which was determined based on the current, that is, new number of directory servers. The transfer can, e.g., be carried out, if upon a request object data are found not to be located at the correct directory server.

According to this proceeding, after the number of directory server changed, the data base of object data is gradually updated with respect to correct storage locations of object tags and associated object data, i.e., are moved to their respective target directory servers.

It is noted, that a newly available directory server may also be inserted as a backup server to replicate one of the directory servers, in which case that part of the data base of object data is copied from the replicated server to the backup server.

The above maintenance steps are preferably executed by the at least one supervisor server HS1–HSt, in order to always use an up to date hashtable.

In the following, the steps of the flow chart of FIG. 2a described in detail.

Initially, the insertion of a new object data corresponding to a new object tag is described.

In a step S21 the system is advised to insert new object data into its data base distributed on the plurality of the directory servers.

In a step S22 the primary directory server for storing the new object data is computed based on, e.g. a number assigned to the new object tag as well as based on the number of available directory servers. The step of identifying the primary directory server is preferably performed by one of at least one supervisor servers HS1–HSt. However, any other component of the system kernel K could identify the primary directory server. The hashfunction for identifying the primary directory server for storing the new object data therefore depends on the number of available directory servers and the target directory server for a particular object tag therefore varies with the number of available directory servers, as indicated by the double arrow in FIG. 2a.

After the target directory server for the new object data has been identified using the hashfunction, the object data is transferred to the target directory server and stored thereon in a step S23. This completes the sequence of steps for inserting new object data.

In the following, also with respect to FIG. 2a, steps for performing a lookup operation for object data related to a desired object tag or object is described.

In a step S24 a lookup request is received by the system kernel K. As it has been outlined before, the request usually is issued by a user reading an object tag using the reader R.

Following the reception of a lookup request, the primary directory server for the particular object tag is determined according to the hashfunction in step S22. It is noted that step S22 is identical for inserting data and retrieving object data, as indicated by the box with broken lines. After the primary directory server for the object tag has been determined using the hashfunction, a request for object data is transmitted to the target directory server in a step S25.

In a step S26, at the primary directory server, it is determined, whether the object data associated with the object tag is actually located at the primary directory server. As outlined before, this is not always the case, since the data base varies in size and directory servers may be added or removed. Therefore, in case a new directory server has been added after object data related to the desired object has been stored on the data base, the primary directory server computed in step S22 will differ from the directory server, where the object data is actually stored. The same holds true, if one of the directory servers has been removed after object data related to the object tag has been inserted into the data base.

If the object data is located on the identified primary directory server, in a step S27 the object data is retrieved from the directory server and subsequently steps for providing the user with desired information are performed by the system kernel are carried out. As outlined before, this may include retrieving application data packets from application servers based on the object data or directly transmitting object data or parts thereof to the user, i.e., to the data processing unit DPU and/or mobile telephone M.

If in step S26 it has been determined that object data related to the object tag is not located at the identified primary directory server, in a step S28, the lookup request is forwarded to other directory servers. In case the number of directory servers has been increased recently, the lookup request may be forwarded to a directory server which is determined using the hashfunction based on a previous number of available directory servers. The same holds true, if the number of directory servers has been decreased recently. If none of the directory stores the desired object data, an error message is generated and the operation ends.

However, it is also possible, that the lookup request is forwarded to all remaining directory servers. If the object data was not located at the desired location, after the correct directory server has been identified in step S28, in a step S29 the object data is retrieved from the directory server and erased from its data base.

Following, the flow advances to step S23. In step S23, as outlined before, the retrieved object data is stored on the target directory server, determined in step S22.

FIG. 3 describes steps for retrieving application data packets related to an object using a flow chart according to another example of the invention. In this embodiment look up operations are described involving a hashfunction employing a modulo operation for identifying a directory server. FIG. 3 also describes, how object data can be rearranged using the hashfunction, in case it is detected that the object data is not stored on the correct directory server.

In a step S31 the system kernel K receives a request from a user, requesting information related to an object. A request at least includes an object tag T; T1–Tw of an object D transmitted from the reading means R to the system kernel. Additionally, the request may, e.g., include an address or identifier of an user and parameters specifying the type of information or service requested. Preferably, the request is received by one of the access servers AS; AS1–ASr. However, as mentioned before, other components of the system may also receive or process the request.

Upon reception of the request for information related to an object, in a step S32, the number of entries in the server hashtable H is assigned to a parameter $\alpha$ and the number of the object tag is assigned to a parameter $\beta$. In the following step S33 a modulo operation $\beta$ mod $\alpha$ is carried out and the result is assigned to a parameter $\gamma$.

In the subsequent step S34 it is determined, whether the hashtable location with the number $\gamma$ contains a record comprising an address of one of the directory servers DS; DS1–DSn or not, i.e., it is determined, whether a directory server with the assigned number $\gamma$ is available.

If the location $\gamma$ of the server hashtable is empty, in a step S35 an operation $\alpha=\alpha/2$ is performed and the flow returns to step S33. In S33, again, $\beta$ mod $\alpha$ is computed in order to obtain a new $\gamma$. The flow then again reaches step S34 and once again it is determined, whether the hashtable location $\gamma$ contains a record comprising one of the directory server addresses.

This loop of steps S33, S34 and S35 is repeated until, in step S35 it is determined that the hashtable location $\gamma$ contains a record comprising a directory server address. Then, in a step S36 a request including the read object tag is transmitted to the target directory server, i.e., the directory server, whose address is stored at the hashtable location $\gamma$.

Subsequently, in a step S37, the target directory server determines, whether the object data stored thereon actually includes a record comprising the read object tag. In case such a record can not be found, the flow returns to step S33, and $\gamma$ is newly computed. The flow then continues as outlined before, until the directory server storing the object data is found. If none of the directory servers stores the object data, an error message is generated.

In the step S38, an object data relocation is performed, if the first available directory server, computed by the above method, did not contain object data comprising the read object tag. In this case, the object data is relocated to the first available directory server, as computed with the above method. The relocation operation preferably includes storing the object data on the "new" directory server and deleting the object data on the "old" directory server.

In a step S39 the directory server storing the object data determines from the object data application server addresses IS; IS1–ISp, storing application data packets associated with the object and returns retrieved addresses and application identifiers to the access server AS; AS1–ASr.

In a step S40 respective data packets are retrieved, using the obtained addresses of application servers or the application server address is transmitted to the user.

In other embodiments, the number of the location of the hashtable including the address of a directory server storing desired object data may be obtained by computing the number of the target object modulo the number of directory servers. Also, it may be adhered to a different sequence of steps for performing the look up operation, e.g., a sequence of steps S39, S38 and S40.

It is also noted that in other embodiments, instead of retrieving application data packets, the address information and further information about services may be transmitted to, e.g., the unit initiating the request. Further, instead of a modulo operation, other mathematical operations providing an analogous distribution of object data onto the plurality of directory servers DS; DS1–DSn may be employed.

Figure 4:
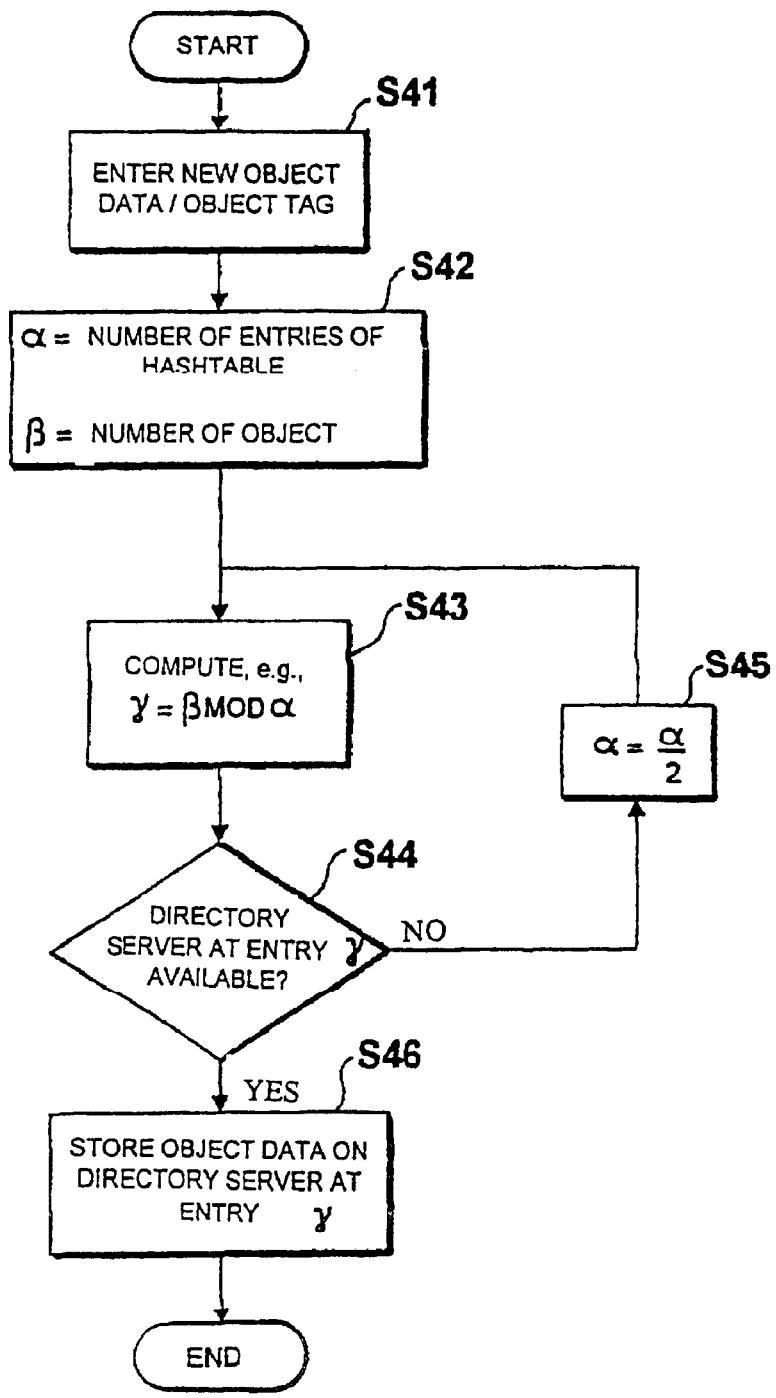
FIG. 4 shows a flow chart of steps performed in accordance with an embodiment of the invention for identifying an directory server for storing new object data.

In the following an example of operations for entering object data related to a new object into the data base maintained on the plurality of directory servers DS; DS1–DSn is described with respect to FIG. 4. In FIG. 4, the hashfunction explained with respect to FIG. 3 is used.

It is preferred, that for inserting object data into the data base, the always up to date hashtable stored in the at least one supervisor server HS1–HSt is used.

In a step S41 the system kernel K receives a request from a user or system-administrator, to insert object data related to a new object into the data base maintained on the plurality of directory servers.

In steps S42 to steps S45, analogously to FIG. 3, the number $\gamma$ of the directory server for storing the object data is computed. Since steps S42–S45 correspond to steps S32–S35, a description thereof is omitted.

If in step S44 it is determined that a directory server at location $\gamma$ is available, in a step S46 the object data is stored on the directory server at location $\gamma$.

Depending on the hashtable, in step S44 a directory server at location $\gamma$ of the hashtable will be identified. In the following, in a step S47 the system kernel will initiate the storage of the object data related to the new object tag at the directory server $\gamma$.

Although not described, the above operation may also include storing respective application data packets on application servers.

Analogously to the previous example described with respect to FIG. 3, in other embodiments the target directory server for storing object data related to a new object tag can be obtained by applying the hashfunction on the available number of directory servers.

The steps described above with respect to FIG. 3 and FIG. 4 assure that object data related to an object tag is most likely stored on a directory server at location $\gamma$ of the hashtable. Moreover it is assured, e.g., if a new directory server has been inserted or an old one has been removed that object data is rearranged appropriately.

In the following, with respect to FIG. 5, an embodiment of one of the plurality of directory servers DS; DS1–DSn is described.

As an example, components of the directory server DS1 are illustrated. The directory server DS1 comprises a central processing unit CPU for controlling operations of the directory server. Further, tag memory means TM are provided, for storing a plurality of tag data blocks TB1–TBi, each comprising at least one of the object tags T; T1–Tw identifying an object and at least one of the application identifiers AI1–AIm. Additionally, the tag data blocks can comprise application server addresses IS; IS1–ISp, storing application data packets corresponding to the at least one application identifiers AI1–AIm.

Figure 5:
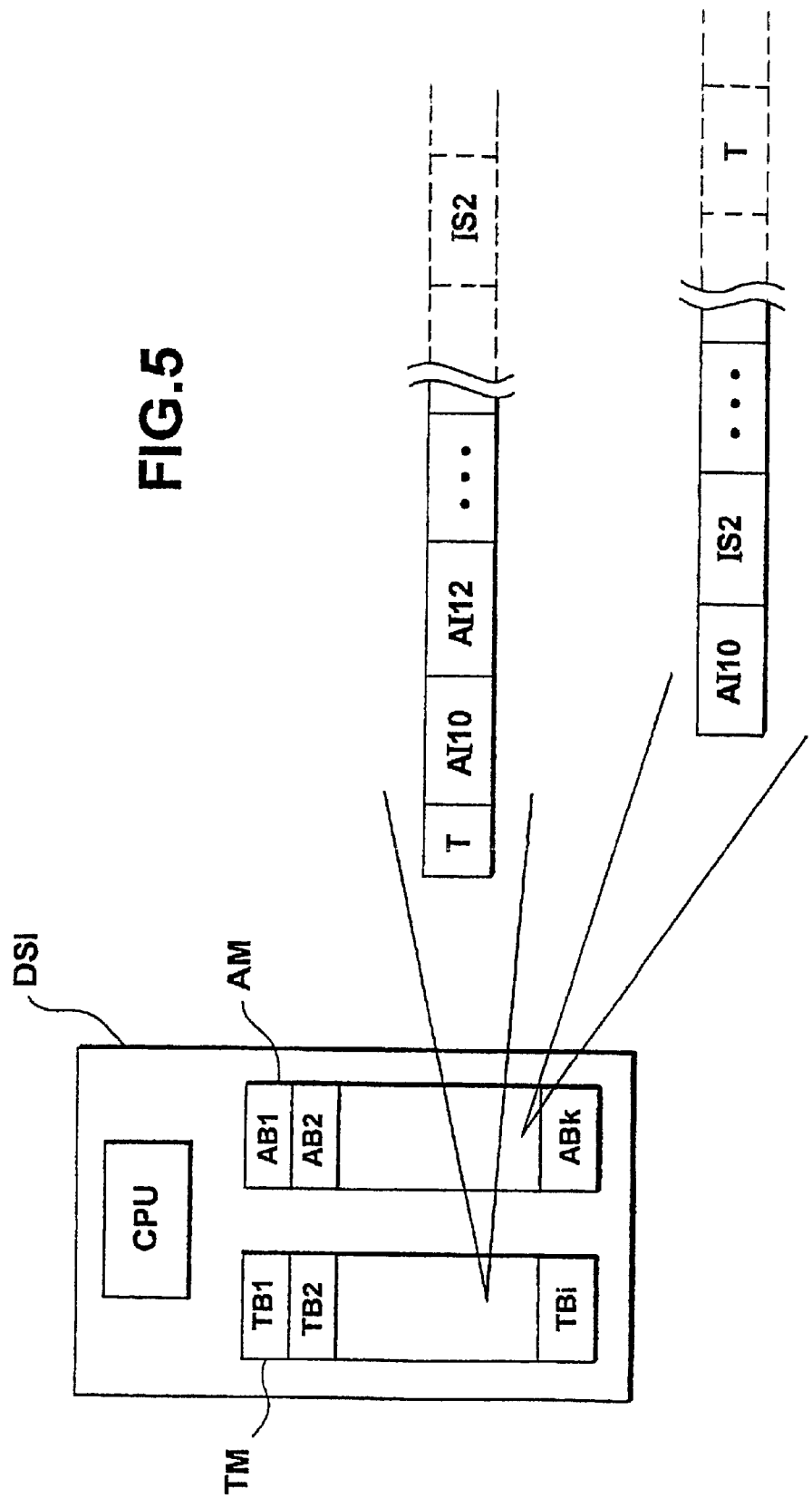
FIG. 5 shows a block diagram of an embodiment of the components of one of the plurality of directory servers as well as components of a tag data block and address data block, respectively.

The embodiment of directory server DS1 shown in FIG. 5 further comprises address memory means AM for storing a plurality of address data blocks AB1–ABk, each comprising one of the application identifiers AI1–AIm, the corresponding application server address IS; IS1–ISp and, optionally, corresponding object tags T; T1–Tw. The address data blocks can be used to perform garbage collection, e.g., if an application data packet has been removed. In this case, the address data block allows to identify tag data blocks storing the respective application identifier.

On the right side of FIG. 5 an example of a tag data block TBi is illustrated. At a first storage location of the data block an object tag is stored, and at subsequent locations of the tag data block application identifiers of application data packets related to the object tag T; T1–Tw are stored. In the shown case, application identifiers AI10 and AI12 are included into the tag data block TBi. Additionally, as indicated by broken lines, the tag data block TBi may comprise application server addresses, of which the application server address IS2 is shown, assumed to store application data packets corresponding to the application identifiers AI10 and AI12.

Also on the right side of FIG. 5, an example of an address data block ABk is shown. At a first location of the address data block ABk an application identifier is stored. In the shown case, the application identifier AI10 is stored. At a subsequent location of the address data block ABk the application server address IS2 is stored, since in the embodiment of FIG. 5 it is assumed that application data packet with the application identifier AI10 is located on application server with the address IS2. Additionally, as indicated by broken lines, the address data block ABi may include object tags, of which the object tag T; T1–Tw is shown, corresponding to the application data packet AI10.

In alternate embodiments, the directory server may comprise single memory means, in which case all object data related to an object are stored in the provided memory means.

If the directory server DS1 receives a lookup request for a specific object, it is first determined, whether the object is actually located on the directory server DS1. If it is not located on the directory server, the request containing the object tag may be forwarded to other directory servers. However, in case a tag data block containing the object tag is stored on directory server DS1, operations are performed to retrieve information about the location of application data packages associated with the object. In the embodiment of FIG. 5, if information concerning an object tag T; T1–Tw is requested, the directory server DS1 will identify tag data block TBi. Tag data block TBi includes application identifier AI10 and the application server address IS2.

If the application server address IS2 is not included in the data block, it will be determined from address data block ABk. A plurality of such lookup procedures regarding a plurality of application data packets can be performed by the directory server and all results will be returned to the unit, which issued the search request.

In the following, an embodiment of the structure of an object tag is briefly described. In order to be able to reference a sufficiently large number of objects, an object tag preferably contains at least 128 bits. The bits may code digits or signs according to the ASCII code or the like.

As an example, in the following a case is described, where digits are coded. The object tag is preferably constituted by a general part and a specific part. For example, if a certain provider requests a number series of 100,000 object tags, for instance, the number series 5878700000–5878799999 might be reserved. In this case, series data can be stored using an identification number 5878700000. The most significant digit of an object tag preferably describes the length of the general part of the object tag, in the above case 5 digits. When a lookup of general information is performed for an object tag in this series, for instance tag 5878701234, the object tag is identified as being part of the above number series of 100,000 numbers by the leading 5 digits. The series is then constructed by letting the five last digits to zero and the lookup is then performed with the series number 5878700000.

The above example shows only object tags with ten digits, in the real system, however, preferably much larger numbers of digits are used.

In the following, an embodiment of the system kernel K is described with respect to FIG. 6.

Figure 6:
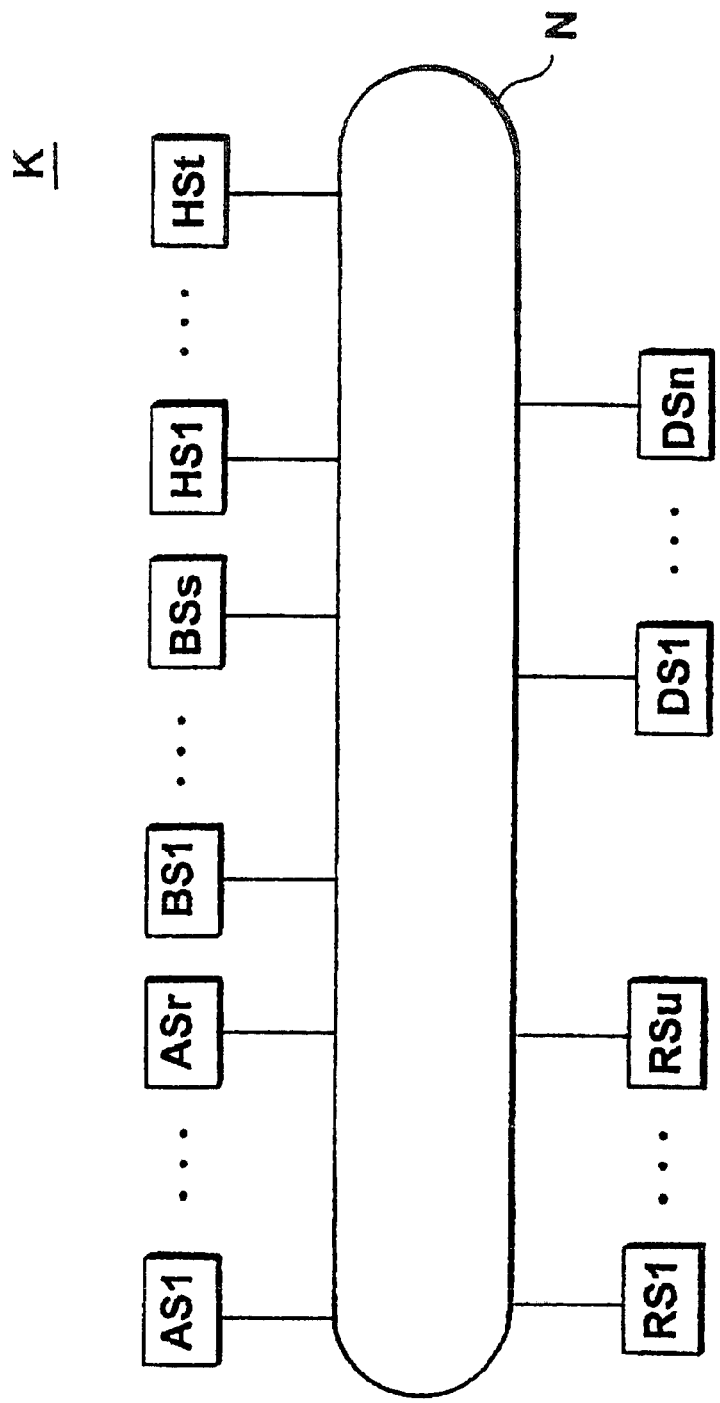
FIG. 6 shows an embodiment of the system kernel.

The system kernel of the shown embodiment of FIG. 6 comprises an arbitrary number of access servers AS; AS1–ASr and directory servers DS1–DSn, an arbitrary number of broker servers BS; BS1–BSs and resource means RS1–RSu and supervisor servers HS1–HSt. All components are connected via a network N for communication with each other. In order to provide a robust system, all or some of the access servers, broker servers, directory servers or other components of the system kernel may be replicated.

The access servers AS; AS1–ASr constitute the link between the user and the system kernel. For example, if a user wishes to obtain information about a certain object, the object tag is read using a reader and transmitted to one of the access server AS; AS1–ASr, preferably an access server located nearby. The access server could be, for example, accessed by connecting a mobile device to a network node of a mobile communication network, which would transmit a lookup request to an appropriate access server. Besides being responsible for receiving an object tag from the outside world, the access servers AS; AS1–ASr preferably also supervise the entire lookup operation of the system for retrieving and presenting information related to an object. Lookup operations under control of the access servers using the directory servers have previously been described with respect to FIGS. 1 to 4.

The broker servers BS; BS1–BSs are responsible for maintaining a data base of directories, resources and other brokers connected to the network. Therefore, the broker servers each preferably comprise memory means for storing a list of directory server addresses, as well as for storing addresses of resource means and addresses of other broker servers. Upon reception of a request for information related to an object, an access server can use at least one of the broker servers for performing certain lookup operations with respect to suitable directory server addresses, resource means, etc. In some cases, the broker servers may also perform steps to identify an appropriate one of the directory servers.

The resource means RS1–RSu are provided for performing certain operations on application data packets, for example speech rendering, speech recognition and language translation services, in order to reduce the complexity of application implementation.

The supervisor servers HS1–HSt preferably maintain an always up to date hashtable used for insert and/or remove of object data.

The system kernel K is preferably distributed, possibly world-wide. Its components can be connected by telecommunication networks or by existing computer networks, such as the Internet.

In the following, another embodiment of the invention is described with respect to FIG. 7. FIG. 7 shows one of a plurality of objects D, marked by an object tag T, reading means R connected to a mobile telephone M or a data processing unit DPU, the system kernel K, as described previously as well as application servers IS; IS1–ISp connected to the system kernel K via the Internet.

The operation of the system according to FIG. 7 is as follows. An object tag T; T1–Tw read by the reader R is transmitted via fixed communication lines or wireless communication links to the system kernel K. The system kernel K performs a lookup operation to retrieve information about the exact location of application data packets containing information related to the object D associated with the object tag T. Once the system kernel K has successfully retrieved the information, preferably addresses of application servers storing information related to the object, the information about storage locations is directly presented to a user or the system kernel may retrieve the information from the application servers which then may be transmitted to the user via the mobile telephone M or the data processing unit PDU.

FIGS. 8 to 11 schematically illustrate steps of an example for performing the method according to the invention.

Figure 8:
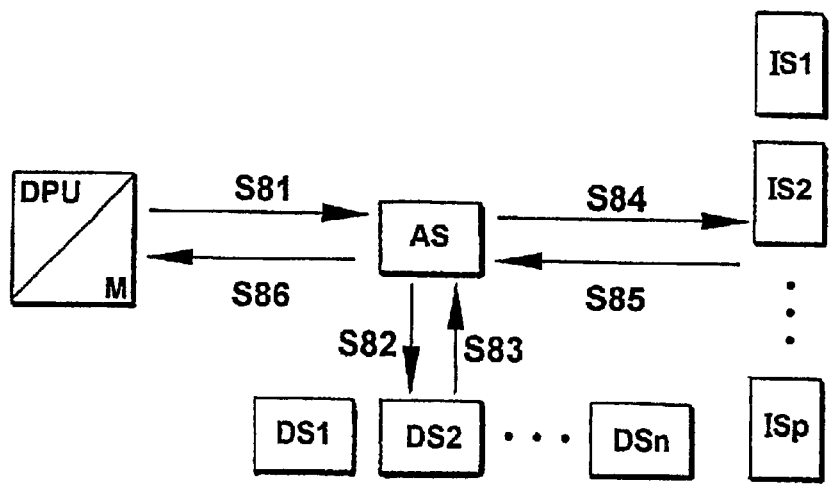
FIG. 8 schematically illustrates an embodiment of steps for performing the method according to the invention.

Firstly, with respect to FIG. 8, an example of steps for retrieving information related to an object are described.

In a first step S81 the mobile station M or the data processing unit DPU issues a lookup request for information related to an object, that is, an object tag read by the reader R. The lookup request is transmitted to the access server AS; AA1–ASr. The access server then transmits the request to one of the directory server which in turn identifies the correct directory servers DS; DS1–DSn storing object data related to the read object tag. However, in other embodiments the identifying of the correct directory server may also be performed by the access server. Examples of steps of identifying the correct directory servers have been outlined previously, specifically with respect to FIG. 3.

In a second step, S82, the access server AS; AS1–ASr requests information from one of the directory servers concerning information related to the object tag. The directory server will perform a lookup operations in its data base, e.g. using a copy of the hashtable, suitably forwards the request to the directory server storing the object data which will identify application data packets associated with the object as well as their respective storage locations, i.e. addresses of application servers. The directory server transmits the data to the access server in a step S83.

Following, in steps S84 and S85, the access server AS; AS1–ASr will either transmit the information retrieved from the directory servers to a user or will perform operations for retrieving specific application data packets from the application servers. In a last step S86, the access server then presents retrieved data to the data processing unit DPU or the mobile telephone M of the user issuing the request for information.

Figure 9:
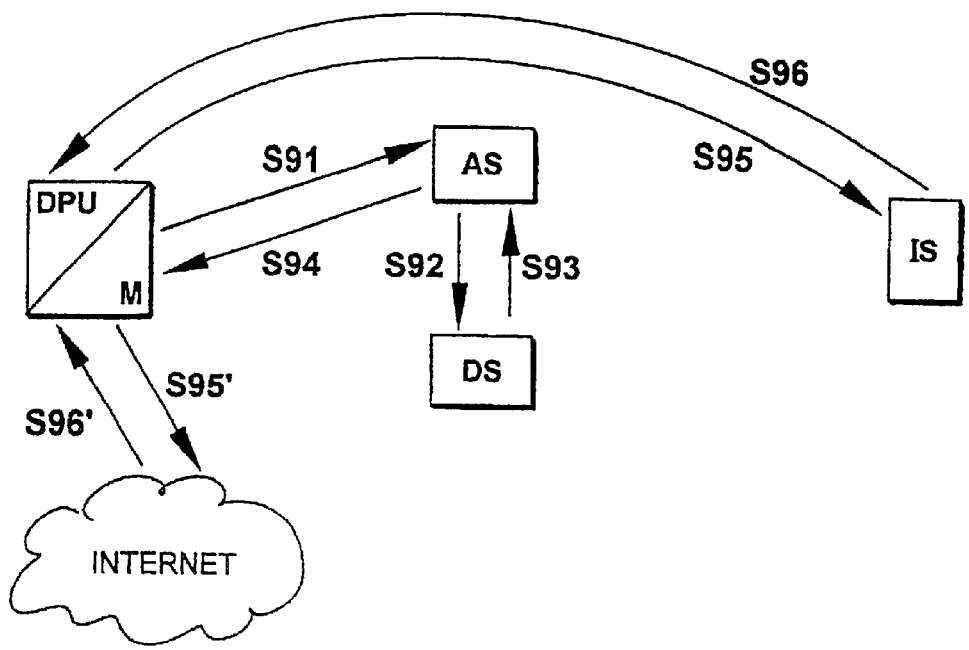
FIG. 9 schematically shows an embodiment of steps for performing the method according to the invention, including the Internet.

A second example of the method according to the invention is described with respect to FIG. 9. The example of FIG. 9 is particularly useful, the system used in combination with a known datacom- or telecom network, such as the Internet. In this case, the system according to the invention will mainly be used for performing the lookup of a regular Internet address, such as a service via a HTTP request.

In a first step S91 the user via the data processing unit DPU or the mobile telephone M issues a lookup request which is received by the access server AS; AS1–ASr, as outlined with respect to FIG. 8. Analogous to steps S82 and S83 of FIG. 8, the access server AS; AS1–ASr initiates operations for identifying a correct directory server and retrieving information related to the object tag which is basis of the lookup request in steps S92 and S93.

In a step S94, the access server can retrieve application data packets base d on the look up result and transmit the result to the data processing unit DPU or mobile telephone M. Alternatively, the access server directly returns the lookup result to the data processing unit DPU or mobile telephone M, which subsequently, in a step S95 may be used for directly retrieving application data packets from an application server. The application data packets are received in a step S96. Alternatively, a regular Internet lookup, such as a regular HTTP request, may be performed in steps S95' and S96'.

Figure 10:
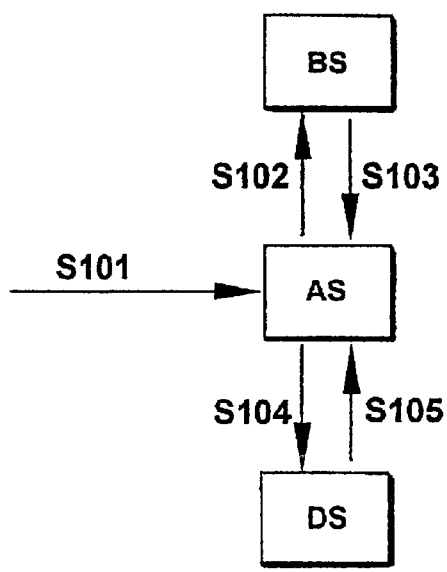
FIG. 10 shows another embodiment of steps for performing the method according to the invention, the steps including lookup procedures performed by broker servers.

Now, with respect to FIG. 10, an alternative example for identifying the correct directory server is described.

In a first step S101, analogously to the previous figures, a lookup request for information related to an object tag is received by the access server AS; AS1–ASr.

Different from the previous examples, broker servers BS; BS1–BSs are now used for assisting the access server AS; AS1–ASr in performing the lookup operation to identify the correct directory server or to perform look ups of resources of the system. In a step S102 the access server requests directory assistance from the broker server BS; BS1–BSs. In a step S103, the address of the correct directory server or resource of the system is transmitted by the broker server, and in steps S104 and S105 the access server retrieves object data related to the object tag, analogously to the previous figures.

Alternatively, in step 103 the broker server BS; BS1–BSs may return the address of any other preferred directory server to the access server and the access server then forwards the look up request to the preferred directory server, which then identifies the correct directory server storing desired object data.

Figure 11:
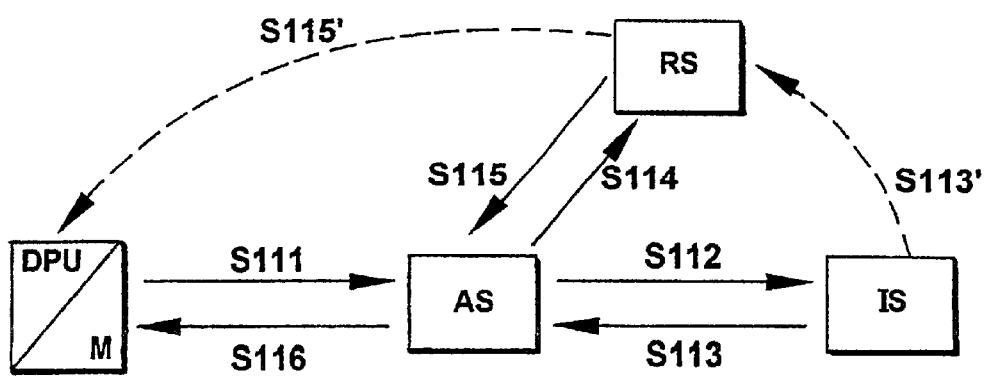
FIG. 11 shows another example of steps for performing the method according to the invention including data conversions performed by resource means.

Another example of steps for performing the method according to the invention is described with respect to FIG. 11. The embodiment of FIG. 11 is, for example, suitable for applications where retrieved application data packets need further processing before being delivered to the user. As outlined before, the processing can be performed by the resource means RS; RS1–RSu, in order to reduce the processing load of the access server AS; AS1–ASr or other servers involved.

As in the previous examples, in a step S111 a lookup request for information related to a particular object tag is received by the access server. Since the lookup of the correct directory server is the same as in previous examples, a description thereof is omitted. In steps S112 and S113, the access server AS; AS1–ASr retrieves at least one application data packet from an corresponding one of the application servers and in a step S114 the at least one application data packet is transmitted to the resource means RS; RS1–RSu, which performs conversions on the received data and retransmits the data back to the access server in a step S115.

In a last step S116 the converted data is forwarded to the data processing unit DPU and/or the mobile telephone M.

Alternatively, as indicated by broken lines, instead of steps S113–S116, in a step S113' application data packets may be directly transmitted from the application server to the resource means RS; RS1–RSu, which perform the operations on the received data. Further the data may be directly transferred to the data processing unit DPU or the mobile telephone M in a step S115', instead of steps S115 and S116.

What is claimed is:

1. A system for connecting objects with information related to the objects, comprising:

a plurality of objects (D) each identified by an object tag (T);

a plurality of application servers each having an address (IS; IS1–ISp) and each including memory means for storing a plurality of application data packets, each related to one of the objects and identified by an application identifier (AI1–AIm);

reading means (R) for reading one of the plurality of object tags (T);

a system kernel (K), including:

a plurality of directory servers (DS; DS1–DSn) each having an address and comprising memory means (TM; AM);

memory means for storing a list of the addresses of all available directory servers in a hashtable (H);

search means (SM) for assigning the object tags to the directory servers (DS; DS1–DSn) based on a hashfunction and the hashtable (H), wherein the assignment of an object tag depends on the number of available directory servers, and the directory servers store object data associated with the assigned object tags in a distributed data base, the object data associating each of said objects with at least one of said application data packets;

means for receiving the read object tag (T) from the reading means (R);

means (DS; DS1–DSn; AS; AS1–ASr) for identifying the directory server (DS; DS1–DSn) assigned to the read object tag based on the hashtable and on the hashfunction, and retrieving the object data corresponding to the object tag; and means for retrieving at least one of the application data packets based on the object data or transmitting at least part of the object data to a receiving unit (M, DPU).

2. A system according to claim 1, wherein object data corresponding to an object comprise an object tag, at least one application identifier and the address of the at least one application server storing the at least one application data packet identified by the at least one application identifier.

3. A system according to claim 1, wherein each of the directory servers (DS; DS1–DSn) comprises:

tag memory means (TM) for storing a plurality of tag data blocks (TB1–TBi), each including one of the object tags (T) and at least one of the application identifiers (AI1–AIm); and address memory means (AM) for storing a plurality of address data blocks (AB1–ABk), each including at least one of the application identifiers and the address of the application server storing the at least one of the application data packets corresponding to the at least one of the application identifiers.

4. A system according to claim 1, further comprising at least one supervisor server (HS1–HSt) for inserting and removing object data from the data base distributed on the plurality of directory servers using the hashfunction; and updating the hashtable (H), if the number of available directory servers changes.

5. A system according to claim 1, wherein the plurality of directory servers stores copies of the hashtable (H) to perform the step of identifying the directory server (DS; DS1–DSn) storing the object data related to the read object tag using the hashfunction.

6. A system according to claim 1, further comprising updating means for periodically updating the copies of the hashtable stored in the directory servers.

7. A system according to claim 1, further comprising a plurality of broker servers (BS; BS1–BSs) including memory means for storing addresses of the directory servers, addresses of resource means (RS; RS1–RSu) and addresses of the broker servers.

8. A system according to claim 1, further comprising a plurality of access servers (AS; AS1–ASr) handling communication between the plurality of application servers and a mobile telephone (M) and/or data processing unit (DPU).

9. A system according to claim 8, wherein the reading means (R) is connected to the mobile telephone (M) or the data processing unit (DPU), connected to the system kernel (K) for a transmission of the read object tag (T) via a wireless communication link or stationary communication link.

10. A system according to claim 1, wherein resource means (RS; RS1–RSu) perform data conversions on the application data packets obtained from the application servers.

11. A system according to claim 1, wherein the system includes a known datacom- or telecom network.

12. A system according to claim 1, wherein components of the system kernel (K) are replicated by replication components and/or each of the application servers is replicated by a replication application server.

13. A system according to claim 1, wherein the object tags (T; T1–Tw) each comprise at least one general part and a specific part.

14. Method of connecting objects with information related to the objects, comprising:

marking each of a plurality of objects with an object tag;

storing a plurality of application data packets, each identified by an application identifier, in memory means of a plurality of application servers, each identified by an application server address;

storing a list of addresses of all available directory servers in a hashtable;

assigning the object tags (T; T1–Tw) to the directory servers (DS; DS1–DSn) using a hashfunction and the hashtable (H), wherein the assignment of an object tag depends on the number of available directory servers, storing in the directory servers (DS; DS1–DSn) object data corresponding to the mapped object tags in a distributed data base, the object data associating the plurality of objects with the plurality of objects application data packets;

reading one of the object tags using a reading means (R) and transmitting the read object tag to an access server (AS; AS1–ASr);

determining the directory server (DS; DS1–DSn) storing object data corresponding to the object tag based on the hashtable and the hashfunction;

obtaining the address of at least one of the application servers storing at least one of the application data packets associated with the object based on the object data; and retrieving the at least one of the application data packets using the address or transmitting data corresponding to the address to a mobile telephone (M) and/or a data processing unit (DPU).

15. Method of communicating information according to claim 14, wherein object data associated with an object comprise at least one object tag, at least one application identifier and the address of the at least one application server storing the at least one application data packet identified by the at least one application identifier.

16. Method of communicating information according to claim 14, wherein the step of storing the object data comprises:
storing a plurality of tag data blocks, each including at least one of the object tags and at least one of the application identifiers;
storing a plurality of address data blocks, each including at least one of the application identifiers and the address of the application server storing the at least one application data packet corresponding to the at least one of the application identifiers; and the step of obtaining the address comprises a search step to obtain at least one of the address data blocks of the at least one application identifier of the tag data block containing the read object tag (T).

17. Method of communicating information according to claim 16, wherein the tag data block comprises addresses of the application servers storing the application data blocks associated with the object.

18. Method of communicating information according to claim 16, including using the hashfunction in inserting and removing object data corresponding to one of the object tags from the data base;

retrieving object data related to one of the object tag from one of the directory servers; and relocating object data related to one of the object tags from one of the directory servers to another.

19. Method of communicating information according to claim 14, wherein the object tags and the directory server addresses are numbered in ascending order and object data corresponding to object tags with sequential numbers are stored on directory servers with sequential numbers;

a list of directory server addresses, sorted by assigned numbers, is maintained as the hashtable; and the hashfunction and the hashtable is used for identifying one of the directory servers.

20. Method of communicating information according to claim 14, wherein relocating object data related to an object, if one of the directory servers is removed or an additional directory server is inserted into the hashtable, includes executing the hashfunction.

21. Method of communicating information according to claim 14, wherein inserting object data related to a new object includes assigning a number to the new object tag and executing the hashfunction.

22. Method of communicating information according to claim 14, wherein the hashfunction for identifying the directory server includes determining the value of the number of the object tag modulo the number of directory servers or determining the value of the number of the object tag modulo the number of hashtable records divided by a multiple of two.

23. Method of communicating information according to claim 14, wherein the identifying of the directory server is performed by one of the directory servers or one of a plurality of broker servers (BS; BS1–BSs), arranged in a network.

24. Method of communicating information according to claim 14, wherein the plurality directory servers and/or the plurality of broker servers (BS; BS1–BSs) maintain a copy of the hashtable and the copies are periodically updated.

25. Method of communicating information according to claim 14, wherein the application data packets include data and/or audio signals containing information about the object or data related to an execution of an application; and the mobile telephone or the data processing unit is used for control and display or play back of information received with the application data packets.

26. Method of communicating information according to claim 14, wherein the application data packets are processed by resource means (RS; RS1–RSu).

27. Method of communicating information according to claim 14, wherein the application servers constitute part of a known datacom- or telecom network.

28. Method of communicating information according to claim 14, wherein the system is communicating over a known datacom- or telecom network and connects services provided by the known network.

29. Method of communicating information according to claim 14, wherein components of the system kernel (K) are replicated by backup components.

* * * * *